United States Patent
Elmasry et al.

(10) Patent No.: US 9,613,534 B2
(45) Date of Patent: Apr. 4, 2017

(54) SYSTEMS AND METHODS FOR CREATING A NETWORK CLOUD BASED SYSTEM FOR SUPPORTING REGIONAL, NATIONAL AND INTERNATIONAL UNMANNED AIRCRAFT SYSTEMS

(71) Applicant: Rockwell Collins, Inc., Cedar Rapids, IA (US)

(72) Inventors: George F. Elmasry, San Marcos, CA (US); Rolf Stefani, West River, MD (US); James Gary Cooper, Jr., Annapolis, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 34 days.

(21) Appl. No.: 14/724,498

(22) Filed: May 28, 2015

(65) Prior Publication Data
US 2016/0351057 A1   Dec. 1, 2016

(51) Int. Cl.
*G08G 5/00* (2006.01)
*G05D 1/00* (2006.01)

(52) U.S. Cl.
CPC ......... *G08G 5/0026* (2013.01); *G05D 1/0022* (2013.01); *G08G 5/0013* (2013.01); *G08G 5/0017* (2013.01); *G08G 5/0043* (2013.01); *G08G 5/0069* (2013.01); *G08G 5/0078* (2013.01); *G08G 5/0091* (2013.01)

(58) Field of Classification Search
CPC .. G08G 5/0017; G08G 5/0026; G08G 5/0043; G01D 1/0022; G01D 1/0027; G01D 1/00445; G01D 1/0044
See application file for complete search history.

(56) References Cited

U.S. PATENT DOCUMENTS

| 4,706,198 | A | * | 11/1987 | Thurman | G08G 5/0082 701/120 |
| 8,468,214 | B1 | * | 6/2013 | Bourlas | G06Q 10/08 709/217 |
| 8,886,459 | B2 | | 11/2014 | Stefani et al. | |
| 8,977,481 | B1 | * | 3/2015 | Downs | G08G 5/0013 701/120 |
| 2004/0008253 | A1 | * | 1/2004 | Monroe | G08B 13/1965 348/143 |

(Continued)

*Primary Examiner* — Dale W Hilgendorf
(74) *Attorney, Agent, or Firm* — Angel N. Gerdzhikov; Donna P. Suchy; Daniel M. Barbieri (57) ABSTRACT

Systems and methods for creating a network cloud based hierarchical architecture for supporting unmanned aircraft are disclosed. A system may include a higher level server, one or more lower level server in direct communication with the higher level server, and one or more control station in direct communication with the lower level server. Each control station may be configured to: control flight operations of an unmanned aircraft; acquire flight information and position information of the unmanned aircraft; and provide updates to the lower level server regarding the flight information and position information of the unmanned aircraft. Each lower level server may be configured to: process the flight information and position information received from the control station; and provide updates to the higher level server regarding the flight information and position information received from the control station.

17 Claims, 6 Drawing Sheets

(56) References Cited

U.S. PATENT DOCUMENTS

| | | | |
|---|---|---|---|
| 2009/0005960 A1* | 1/2009 | Roberts | G08G 5/0082 701/120 |
| 2010/0084513 A1* | 4/2010 | Gariepy | G05D 1/0044 244/190 |
| 2014/0257692 A1* | 9/2014 | Stefani | G01S 13/91 701/519 |

* cited by examiner

SYSTEMS AND METHODS FOR CREATING A NETWORK CLOUD BASED SYSTEM FOR SUPPORTING REGIONAL, NATIONAL AND INTERNATIONAL UNMANNED AIRCRAFT SYSTEMS

CROSS-REFERENCE TO RELATED APPLICATIONS

This application is related to U.S. patent application Ser. No. 13/792,259 filed on Mar. 11, 2013 and entitled "Systems and Methods for Real-Time Data Communications and Messaging with Operators of Small Unmanned Aircraft Systems (sUAS)," which is incorporated herein by reference in its entirety.

This application is also related to U.S. patent application Ser. No. 14/318,569 filed on Jun. 27, 2014 and entitled "Unmanned Vehicle Mission Planning, Coordination and Collaboration," which is incorporated herein by reference in its entirety.

This application is also related to U.S. patent application Ser. No. 14/612,273 filed on Feb. 2, 2015 and entitled "Employing Local, Opportunistic Automatic Dependent Surveillance-Broadcast (ADS-B) Information Processed by an Unmanned Aerial Vehicle Ground Control Station to Augment Other Source "Knowledge" of Local Aircraft Position Information for Improving Situational Awareness," which is incorporated herein by reference in its entirety.

BACKGROUND

The term "unmanned aerial vehicles" (UAVs) may generally refer to aerial vehicles without human pilot aboard. The term "unmanned aircraft systems" (UASs) may generally refer to a class of UAVs, often commonly referred to as drones and/or remotely piloted vehicles (RPVs), which are capable of controlled flight from launch, through in-flight operations, to recovery and/or landing in manners similar to conventional piloted aircraft. The control schemes for these UASs may include real-time or near-real-time control of the flight profile by an operator at a remote control console in constant communication with a particular UAS. Alternatively, the control schemes for these UASs may include execution of preplanned and preprogrammed flight plans, which may be autonomously executed by a particular UAS. The control scheme may also include an integration of both of the above-discussed control schemes such that a single flight may include periods of remote operator control and periods of preprogrammed control.

Information regarding operations of UASs (or UAVs in general) is oftentimes not readily available or otherwise unknown to certain interested parties, including air traffic controllers, national aviation authorities (e.g., Federal Aviation Administration, or FAA, in the United States), as well as other aircraft (manned or unmanned) operators operating in proximity to the UASs. The lack of information regarding operations of UASs may lead to undesirable consequences. Therein lies a need for improvement.

SUMMARY

In one aspect, embodiments of the inventive concepts disclosed herein are directed to a hierarchical system for supporting operations of unmanned aircraft. The system may include a higher level server, a lower level server in direct communication with the higher level server, and a control station in direct communication with the lower level server. The control station may be configured to: control flight operations of an unmanned aircraft; acquire flight information and position information of the unmanned aircraft; and provide updates to the lower level server regarding the flight information and position information of the unmanned aircraft. The lower level server may be configured to: process the flight information and position information received from the control station; and provide updates to the higher level server regarding the flight information and position information received from the control station.

In a further aspect, embodiments of the inventive concepts disclosed herein are directed to a hierarchical system for supporting operations of unmanned aircraft. The system may include a higher level server and a plurality of lower level servers each in direct communication with the higher level server. Each lower level server of the plurality of lower level servers may be configured to: receive updates from at least one control station regarding flight information and position information of at least one unmanned aircraft controlled by the least one control station; consolidate the flight information and position information received from the at least one control station; and provide consolidated flight information and position information to the higher level server.

In another aspect, embodiments of the inventive concepts disclosed herein are directed to a method for supporting operations of unmanned aircraft. The method may include: defining a higher level server; defining a plurality of lower level servers each in direct communication with the higher level server, forming a hierarchical network of servers; and configuring each lower level server of the plurality of lower level servers to receive updates from at least one control station regarding flight information and position information of at least one unmanned aircraft; consolidate the flight information and position information received from the at least one control station; and provide consolidated flight information and position information to the higher level server.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

The numerous objects and advantages of the inventive concepts disclosed herein may be better understood by those skilled in the art by reference to the accompanying figures in which.

DETAILED DESCRIPTION

Reference will now be made in detail to exemplary embodiments of the inventive concepts disclosed herein, examples of which are illustrated in the accompanying drawings.

It is noted that various systems and methods have been developed to provide situation awareness of unmanned aircraft systems (UASs). For example, U.S. Pat. No. 8,886,459, entitled "Systems and Methods for Small Unmanned Aircraft Systems (sUAS) Tactical Tracking and Mission Data Acquisition" (which is incorporated herein by reference in its entirety), discloses an aircraft information server in communication with one or more control stations that may be utilized to provide an interface for controlling and tracking UAS operations. Other techniques, such as those disclosed in: "Systems and Methods for Real-Time Data Communications and Messaging with Operators of Small Unmanned Aircraft Systems (sUAS)," U.S. patent application Ser. No. 13/792,259, "Unmanned Vehicle Mission Planning, Coordination and Collaboration," U.S. patent application Ser. No. 14/318,569, and "Employing Local, Opportunistic Automatic Dependent Surveillance-Broadcast (ADS-B) Information Processed by an Unmanned Aerial Vehicle Ground Control Station to Augment Other Source "Knowledge" of Local Aircraft Position Information for Improving Situational Awareness," U.S. patent application Ser. No. 14/612,273, have also been developed to support utilization of various communication links and/or protocols to facilitate information sharing and to improve situation awareness of UASs.

Embodiments in accordance with the inventive concepts disclosed herein further improves the aforementioned systems and methods to create a network cloud based hierarchical architecture that provides services and integrated situation awareness solutions for a variety of users, which may include UAS operators, air traffic controllers, national aviation authorities, as well as other operators such as National Airspace System (NAS) operators and the like. The term "network cloud" refers to a computing infrastructure that is built and managed over a private or a public network. The term "hierarchical" refers to an implementation that utilizes various components located at multiple levels to jointly form a computing infrastructure. A network cloud based hierarchical architecture configured to provide services and situation awareness solutions for UASs in accordance with the inventive concepts disclosed herein (may be referred to as a "C-UAS" system for purposes of presentation simplicity) may therefore be adapted to operate and provide services at local, regional, national, and international levels.

Figure 1:
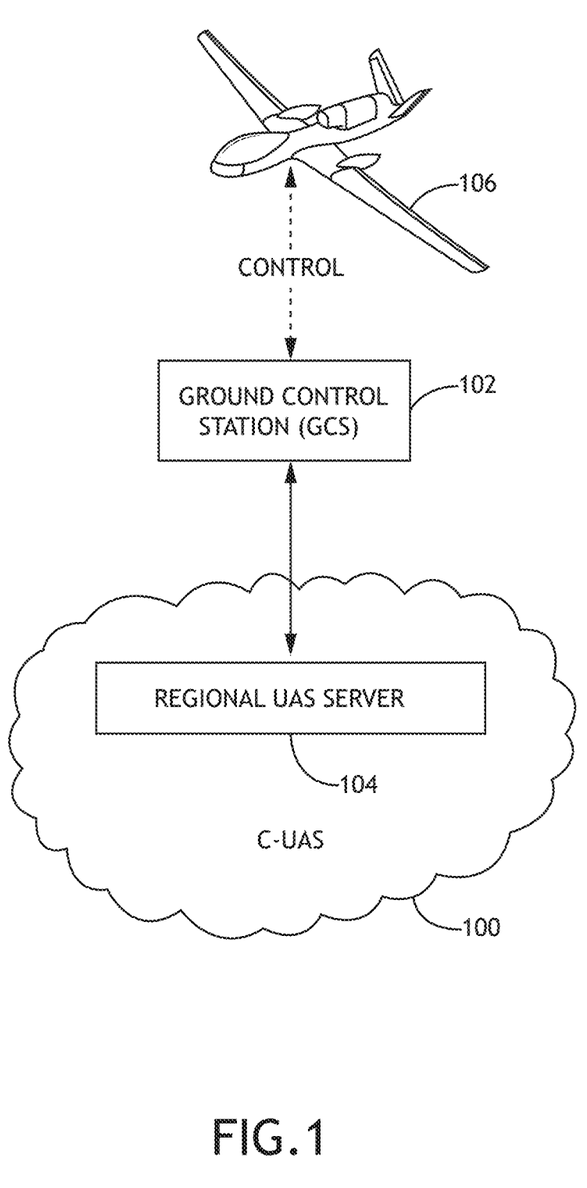
FIG. 1 is an illustration depicting a ground control station in communication with a regional unmanned aircraft system (UAS) server, forming a first level of a network cloud based hierarchical system according to an exemplary embodiment of the inventive concepts disclosed herein.

FIG. 1 is an illustration depicting a ground control station 102 in communication with a regional UAS server 104, which resides within a C-UAS system 100 and provides the ground control station 102 local access to the C-UAS system 100. Similar to the ground control stations described in U.S. Pat. No. 8,886,459, the ground control station 102 referenced herein may be configured to manage/control operations of one or more UASs 106. The ground control station 102 may also be able to acquire flight information (e.g., flight status, planned route and the like) and real-time position information (e.g., geolocation) of the UAS 106. The information obtained by the ground control station 102, including position information of the UAS 106 as well as other situation awareness information, may be provided to the regional UAS server 104 through periodic updates. It is contemplated that the frequency of the periodic update may be adapted to the available bandwidth between the ground control station 102 and the regional UAS server 104. In certain implementations, the updates may be provided in real-time, or in near-real-time, if permitted by the available bandwidth.

It is contemplated that the ground control station 102 may communicate with the regional UAS server 104 via wired or wireless communication channel(s), and the available bandwidth may vary depending on the implementation. It is also contemplated that the communication between the ground control station 102 and the regional UAS server 104 may be carried out in both directions. This may allow the ground control station 102 to obtain services from the regional UAS server 104 in addition to provide the required updates previously described. The services provided by the regional UAS server 104 may include, for example, weather report services, traffic alert services, flight planning services, map services, navigation services and more. It is further contemplated that while only one ground control station 102 is shown in FIG. 1, additional ground control stations 102 may be connected to the same regional UAS server 104 without departing from the broad scope of the inventive concepts disclosed herein.

Figure 2:
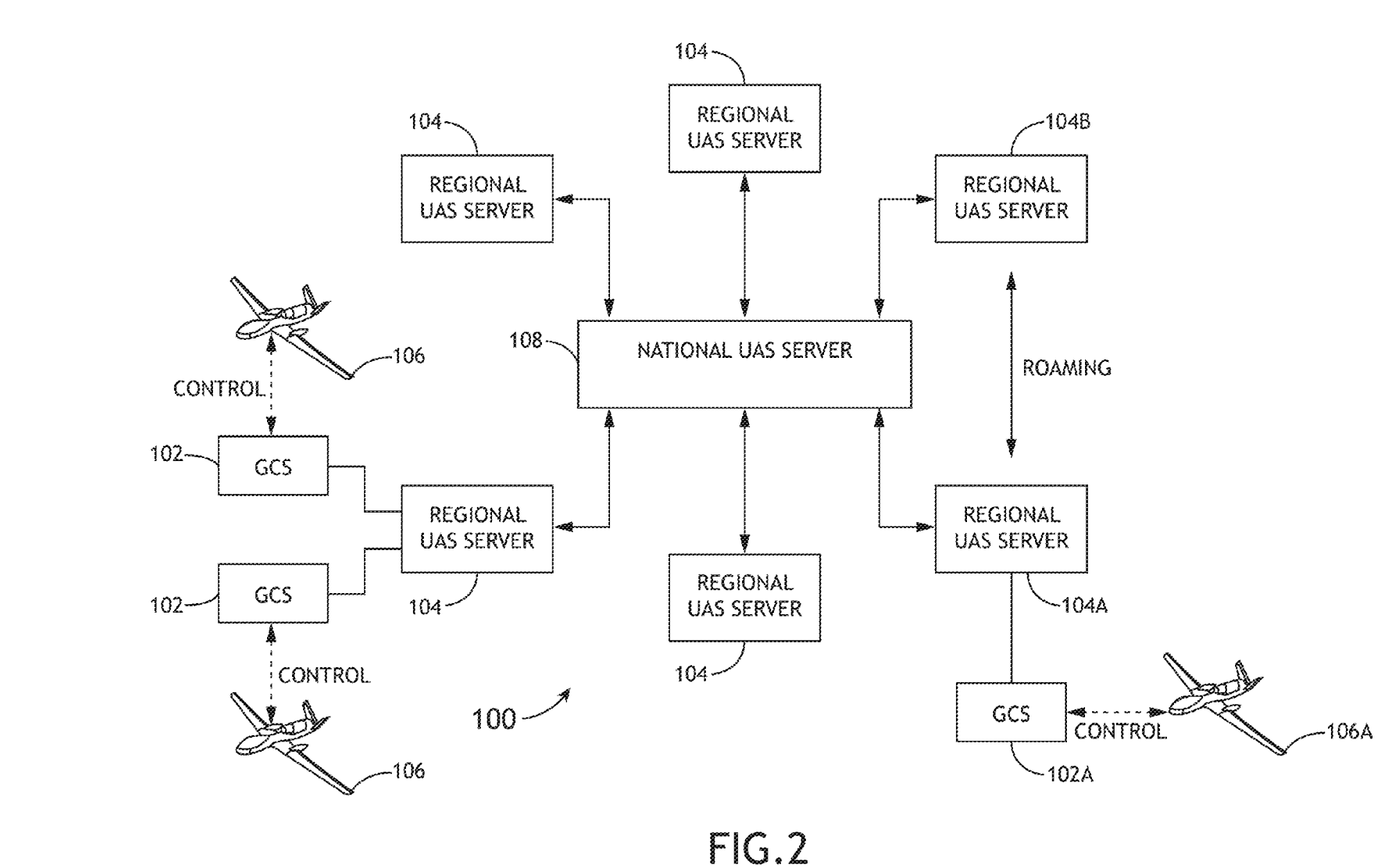
FIG. 2 is an illustration depicting a plurality of regional UAS servers in communication with a national UAS server, forming a second level of a network cloud based hierarchical system according to an exemplary embodiment of the inventive concepts disclosed herein.

FIG. 2 is an illustration depicting a plurality of regional UAS servers 104 connected to a national UAS server 108, forming a second level of the hierarchical C-UAS system 100. Similar to the way each ground control station 102 reports to a regional UAS server 104 at the first level (depicted in FIG. 1), each regional UAS server 104 may be required to update the national UAS server 108 with information it obtained from various ground control stations 102, effectively enabling situation awareness dissemination from the regional UAS servers 104 to the national UAS server 108. Also similar to the way a ground control station 102 can obtain services from a regional UAS server 104 at the first level (depicted in FIG. 1), each regional UAS server 104 may obtain services from the national UAS server 108 as well, effectively enabling service dissemination from the national UAS server 108 to the regional UAS servers 104.

It is to be understood that the terms "regional" and "national" referenced above are merely utilized to represent different levels within a hierarchy. The terms "regional" and "national" are not necessarily tied to any particular geographical regions and/or nations. A regional level may be understood as a level that is lower than a national level. It is contemplated that additional levels may be placed between them or above them (e.g., multiple national UAS servers 108 may communicate with one or more global servers) without departing from the broad scope of the inventive concepts disclosed herein. It is noted, however, for purposes of presentation simplicity, the following descriptions may continue to reference the lower level servers 104 as the regional UAS servers 104 and the higher level server 108 as the national UAS server 108.

It is noted that implementing a hierarchical C-UAS system 100 as described above may provide several advantages. For instance, establishing the required connections between various ground control stations 102 and their regional UAS server 104 may be more feasible (and more reliable) than establishing connections directly to the national UAS server 108. This configuration also avoids creating a bottleneck if every record has to reach a single national server. Additionally, if the national UAS server 108 or connections to the national UAS server 108 fail to operate properly, one of the regional UAS servers 104 may be elected to serve as a new (or temporary) national UAS server 108, providing continued operation of the C-UAS system 100 in case of such failures. It is noted that each regional UAS server 104 may also be configured to optimize, consolidate, or compress the situation awareness information received from the ground control stations 102 before sending the information to the national UAS server 108, allowing the regional UAS servers 104 to save bandwidth and provide privacy protection (when applicable). In addition, it is expected that the amount of reportable data may grow in size (e.g., with the addition of sensor applications to the UASs 106), therefore, communicating data from ground control stations 102 to their regional UAS servers 104 may be more manageable than communicating directly to the national UAS server 108.

The C-UAS system 100 may also provide various useful location based services to the ground control stations 102 more effectively through the regional UAS servers 104. For example, location based services such as weather reports and the like can be bundled since server(s) can be associated to a region with the same weather reports. Since weather reports can be sent from the national UAS server 108 to a particular regional UAS server 104 at once, and that particular regional UAS server 104 may in turn service multiple ground control stations 102, data flow from the national UAS server 108 can be optimized. In addition, operators (or owners) of the regional UAS servers 104 may purchase consolidated services from the national UAS server 108 once and reuse the purchased services multiple times to service multiple UAS operators.

It is noted that the cloud based nature of the C-UAS system 100 also provides scalability and flexibility to the system, allowing the C-UAS system 100 to grow as the UAS market grows. In addition, the C-UAS system 100 configured in this manner allows for efficient regionalized operations where regional UAS server(s) 104 can be configured to meet regional operational needs without affecting the rest of the C-UAS system 100. For instance, if a new service is needed in a specific region (e.g., for use of UASs within a specific region, the information flow from and to the cloud may need to be customized), that region may setup its own (or reconfigure its existing) regional UAS server 104 to define information flow from and to the cloud (i.e., the C-UAS system 100) to in order to support the new service. Once the regional UAS server 104 is properly configured to provide the new service needed in the region, the regional UAS server 104 may then join the cloud and function seamlessly with the rest of the C-UAS system 100, without affecting the requirements, traffic flow, and/or service flow of the rest of the C-UAS system 100.

Figure 3:
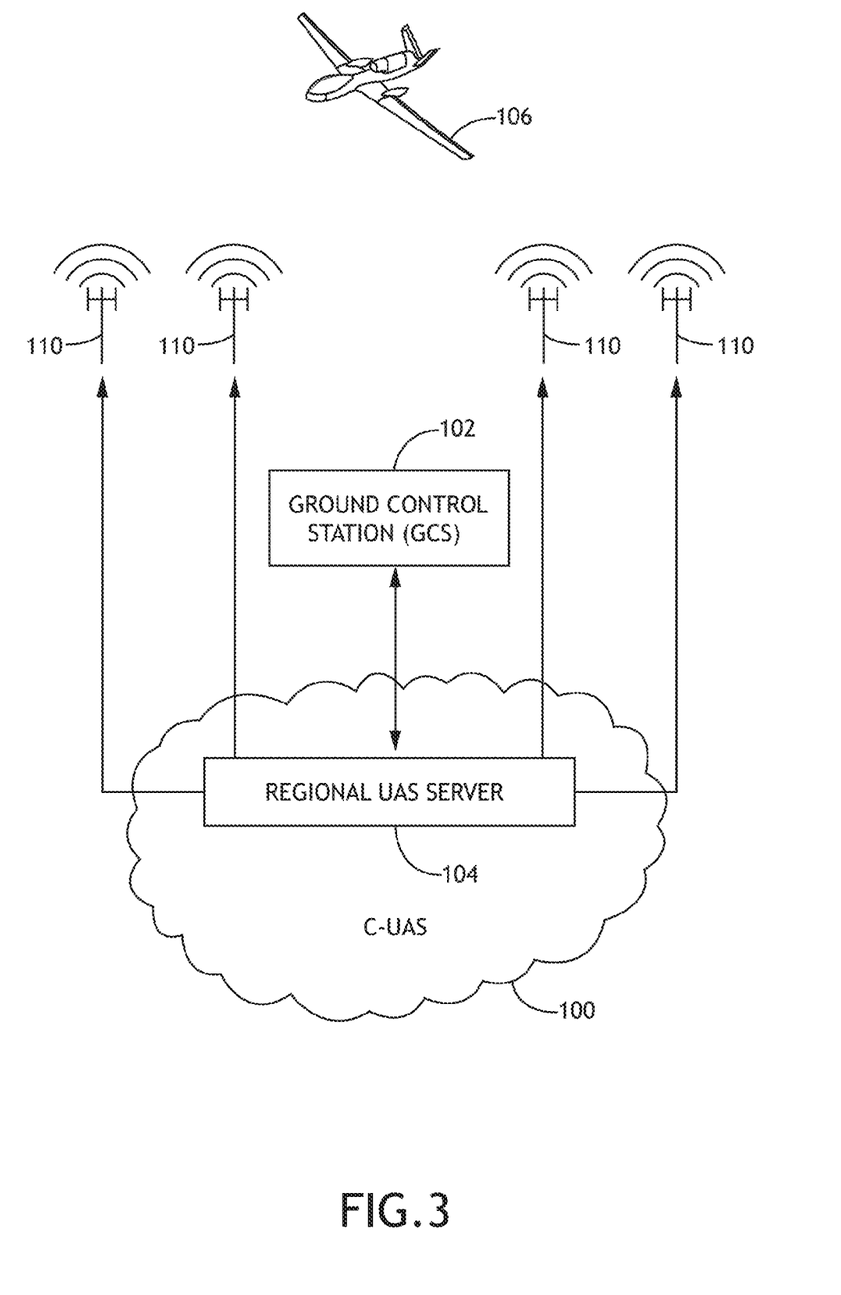
FIG. 3 is an illustration depicting a plurality of access points configured to facilitate communication with a UAS according to an exemplary embodiment of the inventive concepts disclosed herein.

The C-UAS system 100 may also provide seamless handling of mobility and handover between different access points. The term "access point" refers to a device that establishes a connection with a UAS 106 and connects the UAS 106 to a ground control station 102. As the UAS 106 travels through the air, the UAS 106 may exit an area covered by a first access point and enter another area covered by a second access point. The process of transferring an established connection from the first access point to the second access point is referred to as a handover process. FIG. 3 is a simplified illustration depicting a handover process between access points within the same region.

As shown in FIG. 3, multiple Control and Non-Payload Communications (CNPC) towers 110 are utilized as access points. These CNPC towers 110 may be connected together through the C-UAS system 100 via the regional UAS server 104, effectively forming a core network that provides the required networking capability for the CNPC towers 110 to function properly. Since the regional UAS server 104 (and the C-UAS system 100 in general) is aware of the location and flight information of the UAS 106, the regional UAS server 104 (and the C-UAS system 100 in general) may utilize the location and flight information of the UAS 106 to effectively handle the handover process between the CNPC towers 110 as the UAS 106 flies through the region.

It is contemplated that the C-UAS system 100 may also be able to handle handover processes across different regions (e.g., to support long distance flight). Referring back to FIG. 2, suppose a UAS 106A controlled by the ground control station 102A travels pass one region served by a first regional UAS server 104A into another region served by a second regional UAS server 104B, the cloud based nature of the C-UAS system 100 may allow the first regional UAS server 104A to serve as a proxy server (or act as a virtual server) to the second regional UAS server 104B. This ability enables the ground control station 102A to maintain its control of the UAS 106A without having to worry about handovers even across different regions. In other words, the internal processes of the C-UAS system 100 may be hidden from the operators and can be designed to offer on-time services (either locally or through proxy services) to ensure situation awareness data propagate to the appropriate servers, making the C-UAS system 100 scalable, adaptable, and flexible.

It is to be understood that the references to CNPC towers in the examples above are merely exemplary. Various types of communication standards and/or protocols may be utilized to establish connections between the various components of the C-UAS system 100. For instance, satellite links, point to multipoint access waveform in addition to CNPC, cellular network technologies, and/or wireless network technologies may be utilized without departing from the broad scope of the inventive concepts disclosed herein. In fact, some embodiments of the C-UAS system 100 may be configured to be independent of network connectivity types. For example, the interface to the C-UAS system 100 may be configured to be software based and therefore not tied to any particular link type. Links between UASs 106 and ground control stations 102, between ground control stations 102 and regional UAS servers 104, and between regional UAS servers 104 and national UAS server(s) 108, may all be established independently, and they may function seamlessly with each other through the C-UAS system 100.

Figure 4:
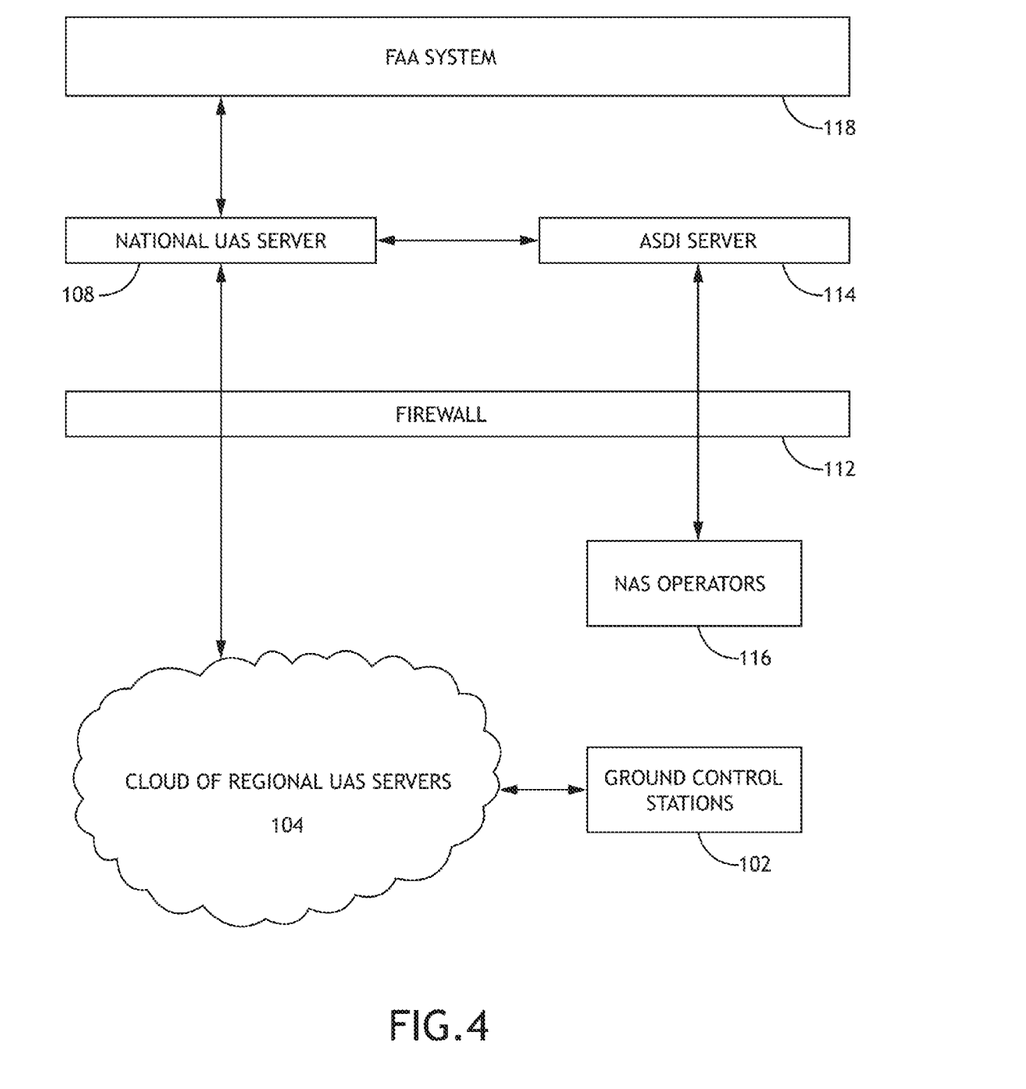
FIG. 4 is an illustration depicting a network cloud based hierarchical system configured to provide an integrated situation awareness solution according to an exemplary embodiment of the inventive concepts disclosed herein.

It is also contemplated that the C-UAS system 100 disclosed herein may be configured to interact with systems maintained or managed by national aviation authorities. FIG. 4 is an illustration depicting an exemplary implementation of a C-UAS system configured to interface with the National Airspace System (NAS) and other systems maintained or managed by the FAA in the United States. More specifically, a part of the NAS is the Aircraft Situation Display to Industry (or ASDI) server 114 which is a situation awareness information system for manned aircraft. By providing a national UAS server 108 behind a firewall 112 and establishing an interface between the national UAS server 108 and the ASDI server 114, situational awareness information may be exchanged between the national UAS server 108 and the ASDI server 114, creating a solution that provides integrated situation awareness information of both manned and unmanned aircraft within the United States. It is noted that the integrated situation awareness information may be made available to both existing NAS users/operators 116 and UAS operators/ground control stations 102. Further, it is contemplated that the national UAS server 108 may be configured to interface with other systems 118 maintained or managed by the FAA without departing from the broad scope of the inventive concepts disclosed herein. It is noted that various interface(s) disclosed in U.S. Pat. No. 8,886,459 may be utilized to facilitate communications between the national UAS server 108 and the various FAA systems (including ASDI server 114 and other systems 118).

A C-UAS system 100 in accordance with the inventive concepts disclosed herein provides a network cloud based hierarchical architecture that provides the scalability, adaptability, and flexibility necessary to anticipate future use and development of UASs. The C-UAS system 100 offers efficient operation control, service delivery, management of UAS traffic, as well as seamless integration with other situation awareness systems. The C-UAS system 100 allows for various types of services to be offered to UAV operators, including services that are currently available (e.g., weather reports, traffic alert, flight planning, map, navigation or the like) and new services that may be created specifically for UASs. The cloud architecture of the C-UAS system 100 also enables intelligent information dissemination and supports seamless handover processes across regions as described previously.

In addition, information made available to the C-UAS system 100 may be utilized for analysis purposes. For instance, data mining and analysis may be carried out as a part of the C-UAS system 100 to analyze regional and national level information. An example of such an analysis may be the "detect and avoid" analysis where real-time data of unmanned and manned aircraft positions and flight trajectories can be analyzed to produce "detect and avoid" information. It may be appreciated that the data mining and analysis can be carried out at the regional level and/or the national level without departing from the broad scope of the inventive concepts disclosed herein. It is also contemplated that other data mining and analysis may be carried out utilizing data made available to the C-UAS system 100 without departing from the broad scope of the inventive concepts or without sacrificing all of their material advantages.

Figure 5:
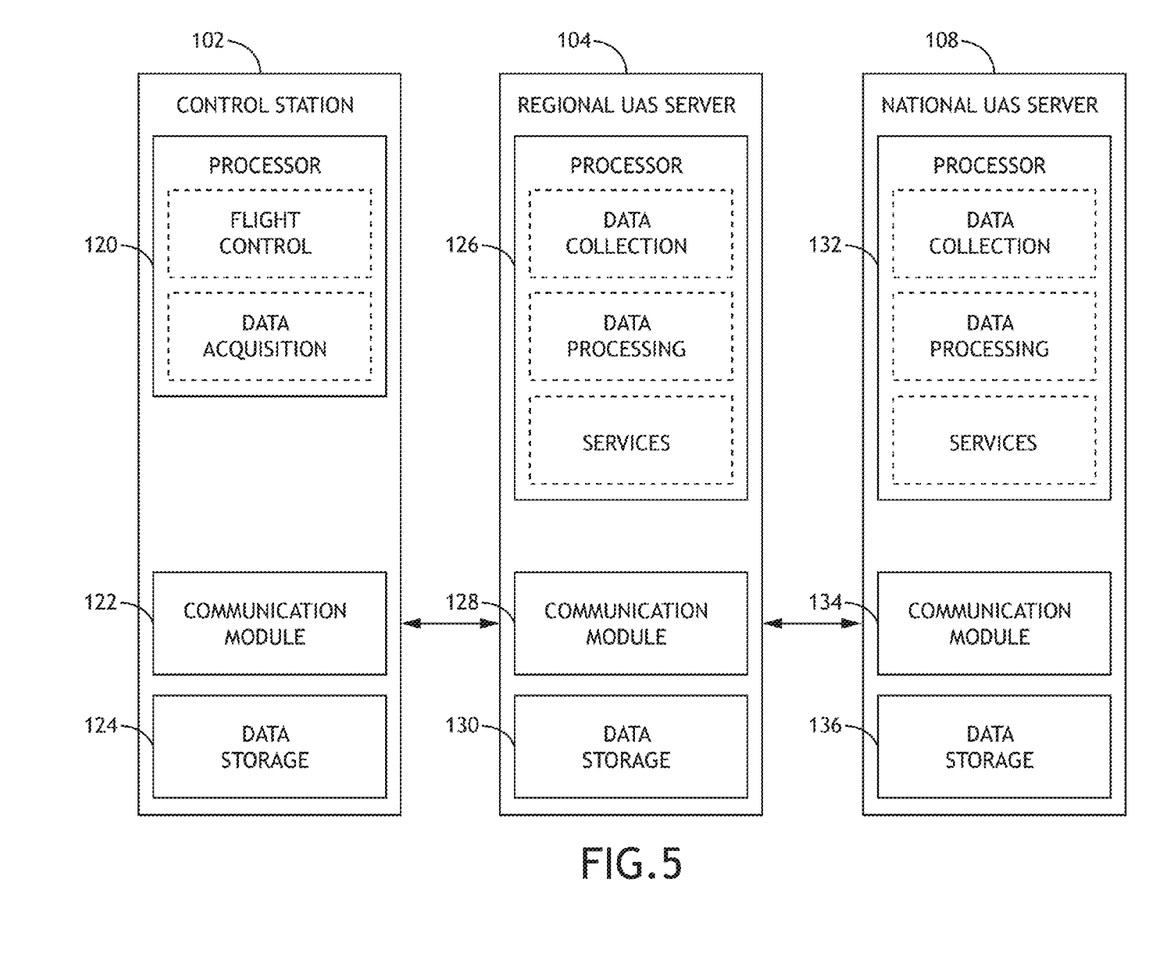
FIG. 5 is a block diagram depicting a ground control station in communication with a regional UAS server, which is in communication with a national UAS server, forming a hierarchical system according to an exemplary embodiment of the inventive concepts disclosed herein.

It is contemplated that each of the ground control stations 102, the regional UAS servers 104, and the national UAS server(s) 108 of the C-UAS system 100 may include one or more processors (e.g., dedicated processing units, application-specific integrated circuits (ASICs), field-programmable gate arrays (FPGAs) or various other types of processors or processing units) coupled with non-transitory processor readable media storing processor-executable code configured to cause the processor to carry out its intended functions. For instance, as shown in FIG. 5, a ground control station 102 may include one or more processors 120 configured to provide flight control for one or more UASs. The one or more processors 120 may also be configured to facilitate data acquisition of flight and position information from the UASs. The ground control station 102 may also include a communication module 122 that facilitates communications between the ground control station 102 and the regional UAS server 104.

The regional UAS server 104 may also include one or more processors 126. The one or more processors 126 of the regional UAS server 104 may collect the information provided by various ground control station 102, process the information collected, and provide the processed (e.g., consolidate) information to the national UAS server 108 as previously described. Similarly, the national UAS server 108 may also include one or more processors 132 configured to collect and process the information received from various regional UAS servers 104. It is noted that the regional UAS server 104 and the national UAS server 108 may each include a communication module 128 and 134, respectively, to facilitate communications within the C-UAS system 100.

It is also contemplated that the one or more processors 120, 126, and 132 of the regional UAS server 104 and national UAS server 108 may be further configured to provide various services to the control station 102 as previously described. These services may include, for example, weather reports, traffic alerts, map services and more. It is further contemplated that the one or more processors 120, 126, and 132 included in the ground control station 102, the regional UAS server 104, and the national UAS server 108 may be communicatively coupled to one or more data storage devices 124, 130, and 136, respectively. Such data storage devices 124, 130, and 136 may be implemented as a non-transitory processor-readable medium and may be utilized to store processor-executable code and/or data. It is contemplated that certain types of data may be logged, recorded, or reported for various purposes, including data mining and analysis.

Figure 6:
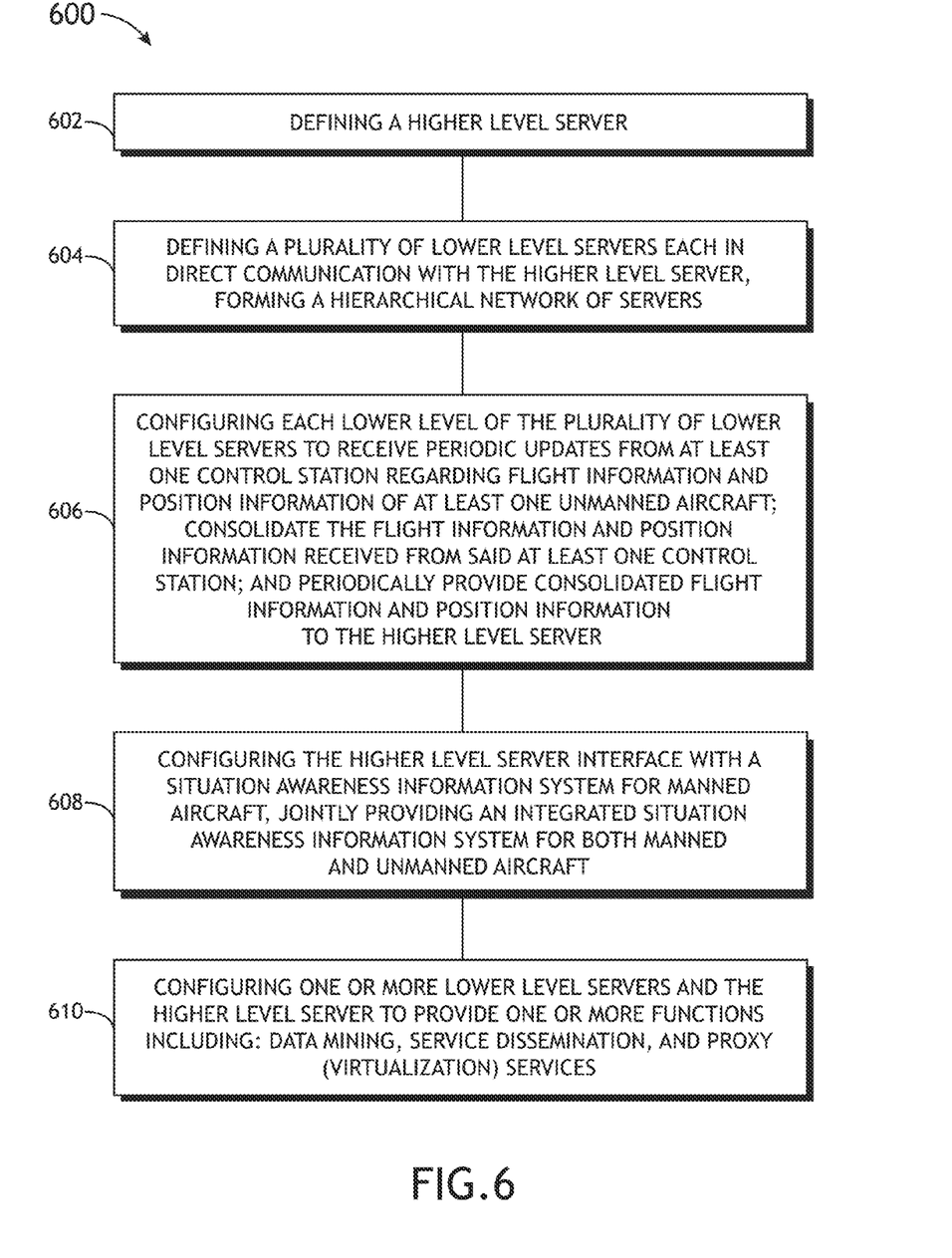
FIG. 6 is a flow diagram depicting an embodiment of a method for supporting operations of unmanned aircraft according to an exemplary embodiment of the inventive concepts disclosed herein.

Referring now to FIG. 6, a flow diagram depicting an embodiment of a method 600 for supporting operations of unmanned aircraft is shown. With reference to the descriptions provided above, a national UAS server, which may also be referred to as a higher level server, may be defined in a step 602. A plurality of regional UAS servers, which may also be referred to as lower level servers, may be defined in a step 604. The higher level server and the lower level servers jointly form a hierarchical network of servers referred to as the C-UAS.

In accordance with the description above, each lower level server of the plurality of lower level servers may be configured to receive updates (e.g., periodically, in real-time, or in near-real-time) from one or more control stations in a step 606. The updates provided by these control stations may include information regarding flight data and position data of one or more unmanned aircraft controlled by these control stations. Each lower level server may in turn consolidate the flight information and position information received from these control stations and update (e.g., periodically, in real-time, or in near-real-time) the higher level server with consolidated flight information and position information it has collected and processed.

It is contemplated that data flow within the C-UAS is not limited to merely providing updates from a lower level server to a higher level server. It is to be understood that a server within the C-UAS may be able to utilize the network to send data and communicate with other servers, which may be located at a higher level, a lower level, or the same level in the hierarchy as the server sending the data. For instance, a higher level server may send data down to one or more lower level servers to help better manage certain situations. One example may be the handling of handover processes across different regions, where a higher level server may send data to one or more lower level servers to help better provide proxy services between the lower level servers serving the different regions. The lower level servers may also exchange data among themselves with no (or minimum) intervention from the higher level server. In another example, a higher level server may send data to one or more lower level servers, allowing the lower lever servers to prefetch the data to improve efficiency. Similarly, a higher level server may send instructions to one or more lower level servers to reserve or to acquire a certain amount of bandwidth to ensure proper communication within the C-UAS, which may be useful if the higher level server needs to establish real-time communication with the one or more lower level servers or if the higher level server expects bandwidth consumptions to be increased to support certain operations such as video steaming, surveillance, or the like.

It is contemplated that a higher level server may also send instructions to various UASs through one or more lower level servers. For example, if it is determined (e.g., by a national aviation authority) that all UASs within a certain region (or regions) should be temporarily grounded, a command may be issued from a higher level server and delivered to all lower level servers serving the specified region (or regions), which in turn may deliver the command to all the UASs. It is to be understood that other types of data and instructions may be exchanged between the various servers within the C-UAS in a similar manner without departing from the broad scope of the inventive concepts disclosed herein.

Also in accordance with the description above, the higher level server may be configured to interface with a situation awareness information system for manned aircraft (such as that provided by the FAA) in a step 608, jointly providing an integrated situation awareness information system for both manned and unmanned aircraft. In addition, it is contemplated that the servers (including the higher level server and one or more lower level servers) may be configured in a step 610 to provide various additional services and functions previously described. For example, one or more servers within the hierarchical network of servers may be configured to provide data mining analysis, service dissemination, as well as support for proxy (virtualization) services previously described.

It is to be understood that embodiments of the inventive concepts disclosed herein may be conveniently implemented in forms of a software, hardware or firmware package. It is to be understood that embodiments of the inventive concepts described in the present disclosure are not limited to any underlying implementing technology. Embodiments of the inventive concepts of the present disclosure may be implemented utilizing any combination of software and hardware technology and by using a variety of technologies without departing from the broad scope of the inventive concepts or without sacrificing all of their material advantages.

It is to be understood that the specific order or hierarchy of steps in the processes disclosed is an example of exemplary approaches. It is to be understood that the specific order or hierarchy of steps in the processes may be rearranged while remaining within the broad scope of the present disclosure. The accompanying method claims present elements of the various steps in a sample order, and are not meant to be limited to the specific order or hierarchy presented.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. A hierarchical system for supporting operations of unmanned aircraft, the system comprising:
   a higher level server;
   a lower level server in direct communication with the higher level server; and
   a control station in direct communication with the lower level server,
   wherein the control station is configured to:
      control flight operations of an unmanned aircraft;
      acquire flight information and position information of the unmanned aircraft; and
      provide updates to the lower level server regarding the flight information and position information of the unmanned aircraft, and
   wherein the lower level server is configured to:
      process the flight information and position information received from the control station; and
      provide updates to the higher level server regarding the flight information and position information received from the control station,
   wherein the higher level server is configured to establish an interface with a situation awareness information system for manned aircraft to jointly form an integrated situation awareness information system for both manned and unmanned aircraft to control flight operation of unmanned aircraft based on integrated situation awareness information.

2. The system of claim 1, wherein the unmanned aircraft is a first unmanned aircraft and the control station is a first control station, and wherein the system further comprises at least one additional control station in direct communication with the lower level server, wherein the at least one additional control station is configured to:
   control flight operations of a second unmanned aircraft;
   acquire flight information and position information of the second unmanned aircraft; and
   provide periodic updates to the lower level server regarding the flight information and position information of the second unmanned aircraft.

3. The system of claim 2, wherein the lower level server is further configured to consolidate the flight information and position information of the first unmanned aircraft provided by the first control station and the flight information and position information of the second unmanned aircraft provided by the second control station prior to provide the periodic updates to the higher level server.

4. The system of claim 1, wherein the lower level server is configured to provide a service to the control station, and wherein the service includes at least one of: a weather report service, a traffic alert service, a flight planning service, a map service, and a navigation service.

5. The system of claim 4, wherein the lower level server is further configured to request the service to be provided by the higher level server.

6. The system of claim 1, wherein the lower level server is a first lower level server, and wherein the system further comprises at least one additional lower level server located at a different geographical region than the first lower level server.

7. The system of claim 6, wherein the higher level server is configured to facilitate communications between the first lower level server and the at least one additional lower level server, forming a network of servers that shares flight information and position information received by each of the first lower level server and the at least one additional lower level server.

8. The system of claim 7, wherein the network of servers enables the first lower level server to serve as a proxy server to one of the at least one additional lower level server.

9. The system of claim 8, wherein at least one of: the first lower level server, the at least one additional lower level server, and the higher level server is configured to analyze real-time data of unmanned and manned aircraft positions and flight trajectories provided by the integrated situation awareness information system.

10. A hierarchical system for supporting operations of unmanned aircraft, the system comprising:
   a higher level server; and
   a plurality of lower level servers each in direct communication with the higher level server, wherein each lower level server of the plurality of lower level servers is configured to:
      receive updates from at least one control station regarding flight information and position information of at least one unmanned aircraft controlled by said least one control station;
      consolidate the flight information and position information received from said at least one control station; and
      provide consolidated flight information and position information to the higher level server,
   wherein the higher level server is configured to establish an interface with a situation awareness information system for manned aircraft to jointly form an integrated situation awareness information system for both manned and unmanned aircraft to control flight operation of unmanned aircraft based on integrated situation awareness information.

11. The system of claim 10, wherein each lower level server is further configured to provide a service to the at least one control station upon receiving a service request from the at least one control station, and wherein the service includes at least one of: a weather report service, a traffic alert service, a flight planning service, a map service, and a navigation service.

12. The system of claim 11, wherein each lower level server is further configured to request the service to be provided by the higher level server.

13. The system of claim 12, wherein the higher level server is configured to provide the service requested to a particular lower level server, and the particular lower level server is configured to service a plurality of control stations in communication with the particular lower level server.

14. The system of claim 10, wherein the higher level server is configured to facilitate communications between the plurality of lower level servers, forming a network of servers that shares flight information and position information received by each of the plurality of lower level servers.

15. The system of claim 14, wherein the network of servers enables one lower level server to serve as a proxy server to another lower level server.

16. The system of claim 15, wherein at least one of the higher level server and the plurality of lower level servers is configured to analyze real-time data of unmanned and manned aircraft positions and flight trajectories provided by the integrated situation awareness information system.

17. A method for supporting operations of unmanned aircraft, the method comprising:
   defining a higher level server;
   defining a plurality of lower level servers each in direct communication with the higher level server, forming a hierarchical network of servers;
   configuring each lower level server of the plurality of lower level servers to receive updates from at least one control station regarding flight information and position information of at least one unmanned aircraft; consolidate the flight information and position information received from said at least one control station; and provide consolidated flight information and position information to the higher level server;
   configuring the higher level server to interface with a situation awareness information system for manned aircraft; and
   forming an integrated situation awareness information system for both manned and unmanned aircraft to control flight operation of unmanned aircraft based on integrated situation awareness information.

* * * * *